Sept. 10, 1963 E. N. VAN DUYNE 3,103,318
AUTOMATIC CONTROLS FOR WINDING AND REWINDING
REELS FOR RECORDING TAPES
Filed Nov. 8, 1961

INVENTOR
EDWARD N. VAN DUYNE
BY Whittemore, Hulbert & Belknap
ATTORNEYS 3,103,318

AUTOMATIC CONTROLS FOR WINDING AND REWINDING REELS FOR RECORDING TAPES

Edward Norman Van Duyne, 211 Alexander Ave., Upper Montclair, N.J.

Filed Nov. 8, 1961, Ser. No. 150,908
3 Claims. (Cl. 242—55.12)

The present invention relates to automatic controls for the winding and rewinding of reels which accommodate recording tapes, and more particularly to apparatus for automatically controlling the rewinding and stopping mechanisms therefor.

One of the objects of the invention is to sense or anticipate by light responsive means the completion of unwinding of a tape from a first reel, the tape being wound on a second reel, and automatically to reverse the direction of the reels to rewind the tape on the first reel.

Another object of the invention is to provide light responsive means designed to stop the winding or rewinding mechanisms in the event the tape should be broken or run off a reel.

Figure 1:
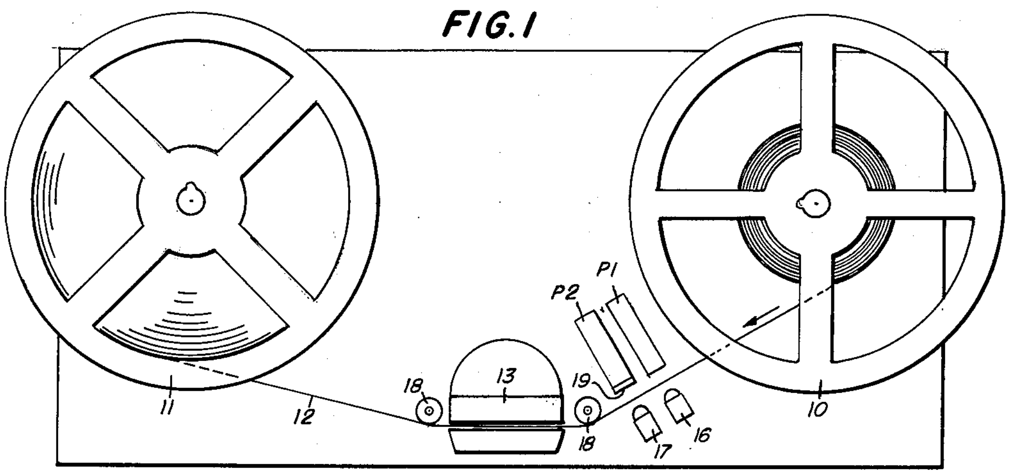
Figure 2:
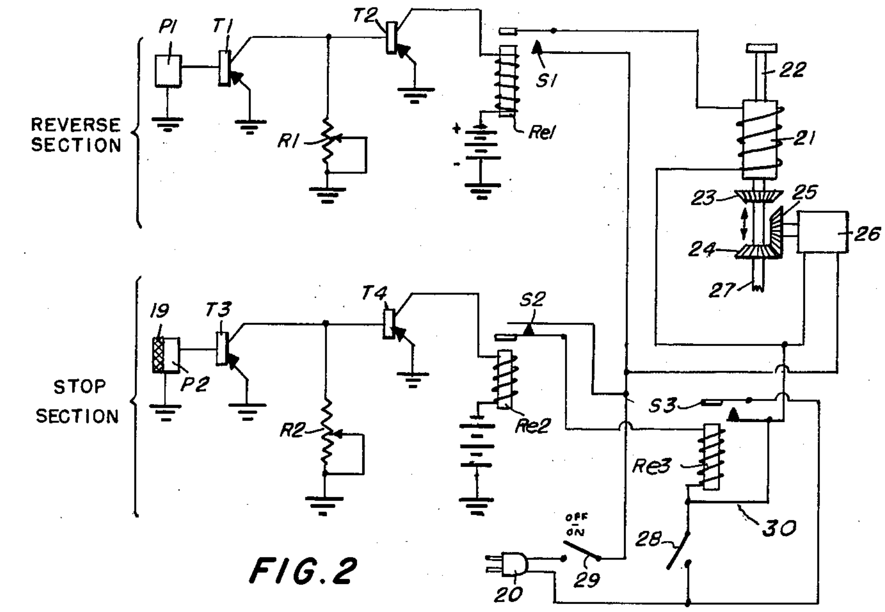
Figure 3:
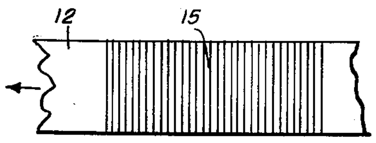

Other objects of the invention will be apparent from the following description of a preferred embodiment thereof when taken with the accompanying drawings in which FIG. 1 is a front view of winding and unwinding reels, sound reproducing means, and light responsive devices associated therewith;

FIG. 2 is a diagram of the electrical circuit including the light responsive means shown in FIG. 1; and FIG. 3 is a fragmentary view of that portion of the tape to which the control means is responsive.

Referring to the drawings, it will be seen that a pair of reels 10, 11 are adapted to wind and unwind a recording tape 12 which is threaded through a sound reproducer 13. These elements are conventional and are not a part of the invention. Near one end of the tape, which is for the most part opaque, the tape is provided with an area 15 which is polarized. This area may be a separate length of film spliced in place or part of the tape itself. Disposed between reproducer 13 and reel 10 are two sources of light 16, 17 which direct light rays in a direction normal to the path of the tape as it is unwound from reel 10 and guided by rollers 18 through the reproducer. On the opposite side of the tape are light sensitive cells P1 and P2, these cells being in alignment with light sources 16, 17, respectively. Cell P2 is provided with a polarized lens or strip 19, the polarization of which is 90° from that of the polarized area 15 of the tape.

Referring now to FIG. 2, a plug 20 is connected to a source of current which supplies energy to the electric motor 26 which winds the reels in either forward or reverse directions as is customary in conventional recorders. Assuming that reel 10 is being unwound, the polarized area 15 of the tape will pass light source 16 and cell P1 at a time when the unwinding of reel 10 has been almost completed. As light passes through this polarized area, cell P1 will generate current which is first amplified by transistor T1 and then by transistor T2 to energize relay R*e*1. This relay is of the delay type, the purpose of which will be apparent as the description proceeds. Normally open switch S1 is then closed by relay R*e*1 to energize solenoid 21 which in turn actuates a reverse armature 22. The reverse device first stops the winding of tape on reel 11 and then reverses the direction of the reels to rewind the tape on reel 10. Any conventional reversing mechanism may be employed, but, as shown in the drawing, a pair of bevel gears 23, 24 are alternately engageable with bevel gear 25 on the shaft of motor 26. Gears 23, 24 are keyed to shaft 27 which drives the reels. During the unwinding of tape from reel 10, armature 22 is normally in the position shown in FIG. 1 but may be depressed or raised manually to control the direction of winding. Since the polarization of light source 17 and lens 19 on cell P2 is in angular relation, light will not be conducted to cell P2. It is to be noted that resistance R1 is provided and is so adjusted that cell P1 is not responsive to normal room light.

The section of the electrical circuit designated "stop section" is designed to be responsive to breakage or running off of the tape. When such breakage or running off occurs, it will be obvious that light rays from source 17 will now enter cell P2 and cause energization of this cell, since the polarized area 15 of the tape is no longer interposed between source 17 and cell P2. At this time both of the light responsive cells will be energized. However, as relay R*e*1 is of the delay type, the stop circuit will function to break the motor circuit before the reversing mechanism is actuated.

The stop section circuit includes the light responsive cell P2 which will generate current when the polarized area 15 is not interposed between source 17 and cell P2 as when the tape is broken. The current from cell P2 is amplified through transistors T3, T4 to energize relay R*e*2. Resistance R2 connects the line between these transistors and the ground and is so adjusted that cell P2 will not respond to normal room light. Relay R*e*2 when energized will open normally closed switch S2 at which time relay R*e*3 will be deenergized. Switch S3 is normally open, but when normally closed switch S2 is closed, relay R*e*3 is energized to close switch S3, thereby to complete the motor circuit. Upon energization of cell P2 and opening of switch S2, switch S3 will also open to break the motor circuit. It will be seen that at this time the circuit which includes switch S3 and solenoid 21 is open so that, regardless of whether or not cell P1 is energized, the reverse section does not function when a break in the tape occurs. To restart the motor the normally open button switch 28 is closed manually to connect the source of current to the motor through line 30, it being understood that main switch 29 is also closed.

While a preferred form of the invention has been illustrated and described, it is intended that such modifications as fall within the terms of the appended claims may be employed.

What is claimed is:

1. The combination with a reel for winding and unwinding an opaque recording tape, an electric motor for driving said reel, a plurality of sources of light, a light responsive cell aligned with each of said sources, said tape being interposed between said sources and said cells, said tape being provided with a transparent polarized area on a selected portion of said tape, one of said cells having a polarized lens adapted to obstruct light rays passing through said polarized area, another of said cells being energized only by rays passing through said area from its aligned source of light, means for reversing the direction of rotation of said reel responsive to energization of said another cell, and means for interrupting the supply of electric current to said motor responsive to energization of said one cell only when the tape is removed from its interposed relation with said sources and said cells.

2. The combination set forth in claim 1 in which the reversing means includes a normally deenergized solenoid for operating said reversing means when energized, a normally open switch controlling energization of said normally deenergized solenoid, and a relay responsive to energization of said another cell for closing said normally open switch to energize said normally deenergized solenoid.

3. The combination set forth in claim 2 in which the means for interrupting the supply of current to said motor includes a normally energized solenoid, a first normally closed switch controlling energization of said normally energized solenoid, a second normally closed switch controlling the supply of current to said motor, said normally energized solenoid closing said second switch, and a relay responsive to energization of said one cell for opening said first switch to deenergize said normally energized solenoid thereby to open said second switch and interrupt the supply of current to said motor.

References Cited in the file of this patent

UNITED STATES PATENTS

| | | |
|---|---|---|
| 2,971,716 | Sampson | Feb. 14, 1961 |
| 2,998,939 | Scott | Sept. 5, 1961 |

FOREIGN PATENTS

| | | |
|---|---|---|
| 808,096 | Great Britain | Jan. 28, 1959 |